United States Patent [19]
Banister

[11] Patent Number: 5,987,056
[45] Date of Patent: Nov. 16, 1999

[54] PN SEQUENCE HOPPING METHOD AND SYSTEM

[75] Inventor: Brian C. Banister, San Diego, Calif.

[73] Assignee: LSI Logic Corporation, Milpitas, Calif.

[21] Appl. No.: 08/969,219

[22] Filed: Nov. 13, 1997

[51] Int. Cl.$^6$ .................................................... H04B 1/66
[52] U.S. Cl. ........................................... 375/200; 375/203
[58] Field of Search ..................................... 375/200, 203, 375/202; 370/311, 335

[56] References Cited

U.S. PATENT DOCUMENTS

| | | | |
|---|---|---|---|
| 5,291,475 | 3/1994 | Bruckert | 370/330 |
| 5,793,975 | 8/1998 | Li | 375/200 |
| 5,910,944 | 6/1999 | Callicotte et al. | 370/311 |

*Primary Examiner*—Chi H. Pham
*Assistant Examiner*—Khai Tran
*Attorney, Agent, or Firm*—Mitchell, Silberberg & Knupp LLP

[57] ABSTRACT

A novel method for PN sequence hopping where a PN sequence generator has been disabled for a predetermined time before a future time slot where the PN sequence generator will be enabled. The method comprises the steps of writing a base state into storage for a first hop only, calculating from the base state a new state advancing a PN sequence to the beginning of the future time slot, loading the new state into the PN sequence generator, and enabling the PN sequence generator. For subsequent hops, the base state is the new state calculated in the previous hop. In a preferred version, the step of calculating a new state comprises multiplying the base state by a Galois Field polynomial; a serial Galois Field multiplier can be used to perform this multiplication. A system embodying the present invention comprises a PN sequence generator, a control processor, and a storage device. At a desired time after storing the base state, the PN sequence generator is disabled for a predetermined time before a future time slot where the PN sequence generator will be enabled. The control processor calculates a new state advancing a PN sequence to the beginning of the future time slot, and loads the new state into the PN sequence generator, which is subsequently enabled. The PN sequence generator writes the new state into the storage device for a first hop only; for subsequent hops, the base state is the new state calculated in the previous hop.

20 Claims, 3 Drawing Sheets

PN SEQUENCE HOPPING METHOD AND SYSTEM

BACKGROUND OF THE INVENTION

1. Field of the Invention

This invention relates to the field of spread spectrum wireless communications or any field that uses Pseudorandom Noise (PN) sequences. For communications applications, PN sequences are generally cyclically repeating sequences of digital 1's and 0's which exhibit certain pseudorandom properties, and are typically generated using a Linear Feedback Shift Register (LFSR).

2. Description of the Related Art

Some applications allow for "sleep" periods, during which the PN sequence may not be needed. An example is a Direct Sequence Spread Spectrum (DSSS) cellular system using long duration, rapidly switching (between pseudorandom 1's and 0's) PN sequences. Cellular systems generally include provision for a sleep mode during which it is not necessary for the Mobile Station (MS), such as a hand held cellular phone, to receive the transmission from the Base Station (BS). In this way portions of the mobile unit can be powered down during the sleep period and the average power drain can be decreased, thereby increasing the standby time of the battery powered unit.

At the end of a sleep period in a DSSS system, it is necessary for the MS to have a local version of the PN sequence which is synchronized to that of the BS. Prior art designs maintain a high speed clock for the purpose of maintaining the synchronization of the PN sequence during sleep. There is no capability of turning off this high speed clock and maintaining PN sequence synchronization. Since the prior art requires the maintenance of a high speed clock, the average power drain of the unit is higher than it would be if this clock source could be turned off.

Therefore, an object of this invention is to optimally use this sleep period by turning off as many electronic components in the system as possible, particularly when a long duration rapidly switching PN sequence must be maintained.

SUMMARY OF THE INVENTION

This object is achieved by the present invention, which relates to a method for PN sequence hopping where a PN sequence generator has been disabled for a predetermined time before a future time slot where the PN sequence generator will be enabled. The method of the present invention comprises the steps of writing a base state into storage for a first hop only, calculating from the base state a new state advancing a PN sequence to the beginning of the future time slot, loading the new state into the PN sequence generator, and enabling the PN sequence generator. For all subsequent hops, the base state is the new state calculated in the previous hop.

In a preferred version of a method according to the present invention, the step of calculating a new state comprises multiplying the base state by a Galois Field polynomial; a serial Galois Field multiplier can be used to perform this multiplication. The serial Galois Field multiplier is a linear feedback shift register utilizing insertion architecture.

A system according to the present invention comprises a PN sequence generator, a control processor, and a storage device. At a desired time after a base state has been stored, the PN sequence generator is disabled for a predetermined time before a future time slot where the PN sequence generator will be enabled. The control processor calculates a new state advancing a PN sequence to the beginning of the future time slot, and loads the new state into the PN sequence generator, which is subsequently enabled. For a first hop only, the new state is stored in a storage device. For all subsequent hops, the base state is the new state calculated in the previous hop.

The following comments briefly summarize how the present invention operates. At the end of a sleep period in a DSSS system, it is necessary for the MS to have a local version of the PN sequence which is synchronized to that of the BS. Note that the PN sequence is assumed to be synchronized prior to the sleep period—thus the information exists to bring up the PN sequence at the appropriate state at the end of the sleep period. The present invention uses the state of the PN sequence generator prior to the sleep period to calculate the appropriate generator state at a desired time after the end of the sleep period. In this way the high speed clock which runs the PN generator LFSR can be turned off. A low speed clock, typically a 32 kHz oscillator, is maintained and controls a counter to let the system know when to turn back on. The low speed clock consumes less power than the high speed clock, and thus there is a power savings.

A simple analogy is to a clock or watch. If one has an external timer and does not need the watch output for some period of time, one could set the timer to N hours, set the watch N hours ahead and turn the watch off. When the timer expires, the watch may be turned on and will display the correct time thereafter. In the present invention, the PN generator LFSR is analogous to the watch. The low speed clock is analogous to the timer. Setting the watch is analogous to performing the PN sequence hop, which hops the LFSR state over all the intermediate states and directly from the state prior to the sleep period to the state after the sleep period.

These and other aspects, features, and advantages of the present invention will be apparent to those persons having ordinary skilled in the art to which the present invention relates from the foregoing description and the accompanying drawings.

DESCRIPTION OF THE PREFERRED EMBODIMENTS

A. Terminology

The terminology of this description refers to a "slotted" mode for paging channel monitoring in a DSSS cellular system. The "slot" is the period of time during which the mobile must monitor the paging channel. During any other period of time the mobile does not need to monitor the paging channel. This nonmonitoring time is then used for calculations and sleep. A low speed clock used in the power saving sleep mode will generally be referred to as a 32 kHz oscillator, though in principle any oscillator could be used; to attain any benefit the oscillator used should result in lower power drain than retaining the PN sequence generator's normal fast clock. An insertion architecture for a PN sequence generator, described below, is generally used to describe the invention.

B. Sequence of Events

Figure 3:
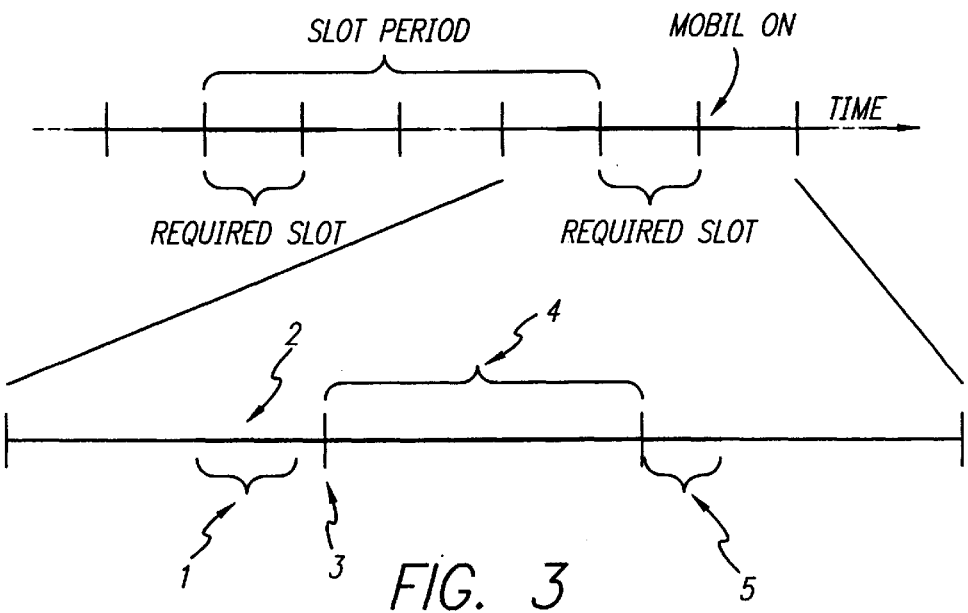
FIG. 3 is a timeline of slotted mode activity.

A representative sequence of events performed for PN sequence hopping is shown on the timeline of FIG. 3, which shows that the paging channel is monitored for one slot. Note that there is some period of time during which the mobile is on and not yet monitoring the slot; the mobile needs some time in order to reacquire some timing information and perform computations. The actions shown in FIG. 3 are more fully described below:

Step 1. Power up, reacquire timing and PN sequence hop: full system power up including the high speed clock, the radio (receive portion) and peripherals. There is some radio settling time before any reacquisition processing starts. Typically, there will be a shorter PN sequence, not hopped, which is transmitted by the Base Station (BS) and allows the Mobile Station (MS) to reacquire timing. This timing is reacquired by searching a window of possible timings, the size of which is determined as a function of the off time, low speed clock stability and calibration accuracy. PN sequence hop processing is performed during this time; a new PN sequence generator state is calculated and the PN sequence generator state is hopped to the beginning of the required slot. The PN sequence generator remains disabled during this step.

Step 2. The new PN sequence generator state is loaded into the PN sequence generator, which is still disabled.

Step 3. PN sequence generator is enabled (starts running): the state previously written into the generator corresponds to this point of time, so the generator is now started. The PN sequence generator writes its state into a register such that it may be used for the next hop. Note that in steady state this is not necessary, as the value has just been written and is already known. However, this function is needed to give the sequence state necessary for the very first hop performed.

Step 4. Monitoring slot: the PN sequence state is properly aligned and the MS can successfully receive the required slot. If this is the first "slot" and no hops have yet been performed, then the sequence state written in Step 3 above must be read for use in the first hop; otherwise, the previously written result can be used.

Step 5. Shutdown decision, power down: the mobile goes through power down procedures, which include setting the low speed clock (32 kHz) counter with the sleep time. PN sequence hop processing can be performed just after power up or just prior to power down. A preferred realization performs the processing just after power up rather than just before power down because this allows the processing to be done while other events are already going on (radio setup and timing reacquisition, etc). Thus, the system does not need to be left powered up while only processing is occurring before the system is turned off.

C. PN Definition and Circuits

Binary pseuclo-noise sequences have a number of properties analogous to a wide sense stationary equally likely binary random process. These properties ensure that the resulting spectrum and correlation properties appear noise like. The behavior of a pseudo-noise generator is governed by its generator polynomial. This takes the form of Equation 1 below:

$$G_I(D) = g_0 + g_1 D + g_2 D^2 + \ldots + g_n D^n \quad \text{Equation 1}$$

Here D is the delay operator. The polynomial coefficients are mod-2 numbers (0 or 1). This polynomial defines a finite field commonly called a Galois Field (GF) and termed GF($2^N$) because there are $2^N$ elements in the field. Note that both $g_0$ and $g_N$ will always be 1 for a maximal order-N sequence. The output equation is:

$$I[n] = g_1 I[n-1] \oplus g_2 I[n-2] \oplus g_3 I[n-3] \oplus \ldots \oplus g_N I[n-N] \quad \text{Equation 2}$$

Figure 1:
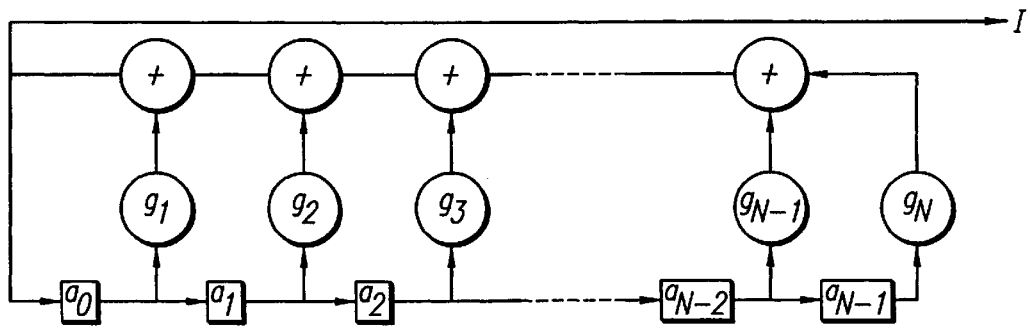
FIG. 1 is a diagram of a prime architecture linear feedback shift register.
Figure 2:
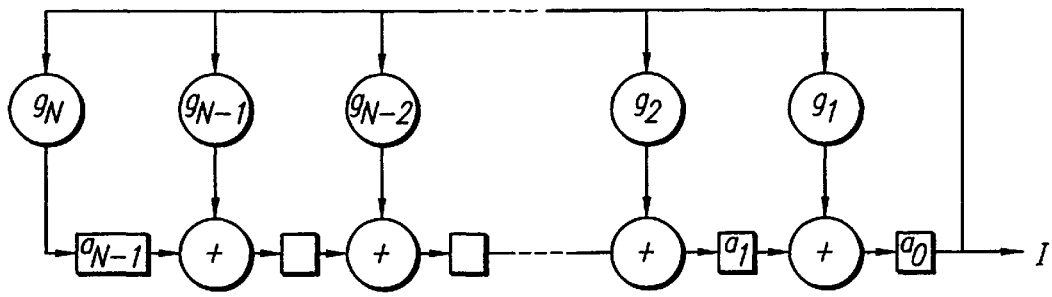
FIG. 2 is a diagram of an insertion architecture linear feedback shift register.

The output of Equation 2 is obtained directly by the circuit of FIG. 1. This is referred to as the "prime architecture" as all feedback is to the first register. Another circuit to obtain the same output is shown in FIG. 2; this is referred to as "insertion architecture" as feedback is inserted midchain. The insertion architecture generator does not go through the same sequence of states, though the resultant output is the same. The insertion LFSR has the advantage of faster operation. Each XOR output is derived from only two inputs, minimizing gate delay. With the speed of modern circuits this is generally not a critical issue at the PN sequence rates typically used.

A PN sequence can be generated using either the insertion or prime architectures. Matrix representation can be used to define each state as a function of clock cycle. For insertion architecture:

$$\bar{\bar{G}}_1 = \begin{bmatrix} g_1 & 1 & 0 & \cdots & 0 \\ g_2 & 0 & 1 & \cdots & 0 \\ g_3 & 0 & 0 & \cdots & 0 \\ \cdots & \cdots & \cdots & \cdots & \cdots \\ g_N & 0 & 0 & \cdots & 0 \end{bmatrix} =$$

PN generator matrix for the insertion architecture $$\bar{a}(n) = \begin{bmatrix} a_0 \\ a_1 \\ \cdots \\ a_{N-1} \end{bmatrix} = \text{state vector of LFSR, insertion architecture}$$

I (n)=PN output
Then:

$$\bar{a}(n+1) = \bar{\bar{G}}_1 \cdot \bar{a}(n)$$

and more generally $$\bar{a}(n+M) = \bar{\bar{G}}_1^M \cdot \bar{a}(n)$$

The output I at any given time is $a_o$:

$$I(n) = \bar{a}(n)^T \cdot \bar{1}$$

where $$\bar{1}^T = [1 \ 0 \ \ldots \ 0]$$

$$IPN(n+M) = (\bar{\bar{G}}_1^M \cdot \bar{a}(n))^T \cdot \bar{1}$$

Similarly, for prime architecture:

$$\bar{\bar{G}}_P = \begin{bmatrix} g_1 & g_2 & g_3 & \cdots & g_N \\ 1 & 0 & 0 & \cdots & 0 \\ 0 & 1 & 0 & \cdots & 0 \\ \cdots & \cdots & \cdots & \cdots & \cdots \\ 0 & 0 & 0 & \cdots & 0 \end{bmatrix} = \bar{\bar{G}}_1^T = \text{PN generator matrix for the insertion architecture}$$

and $$IPN(n+M) = \left(\bar{\bar{G}}_P^M \cdot \bar{a}(n)\right)^T \cdot \bar{1}$$

D. PN Sequence Hopping Calculation

Figure 4:
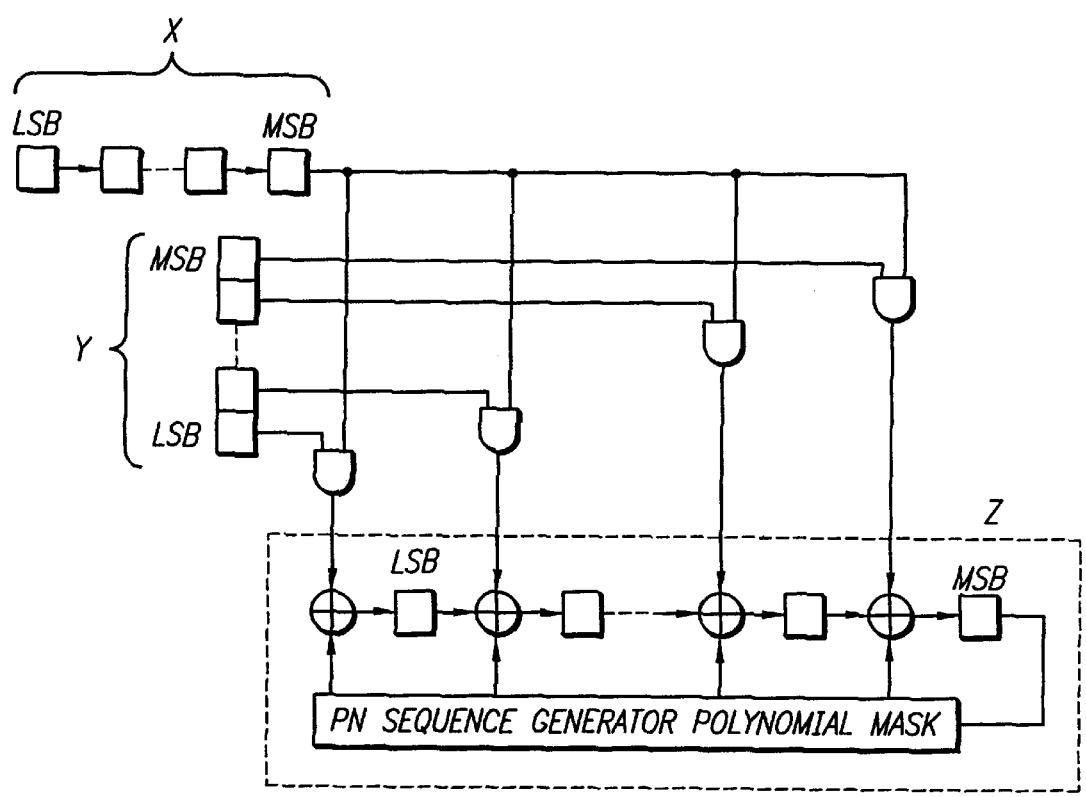
FIG. 4 is a diagram of a serial Galois Field Multiplier.

The PN sequence generator is a Linear Feedback Shift Register (LFSR). It is commonly described mathematically in terms of Galois Fields (GF). The resultant state of an insertion LFSR., which is clocked some number of times from a base state, can be calculated using GF arithmetic by multiplication of the base state by some GF polynomial. The product is the resultant state. A realization of a serial GF multiplier is shown in FIG. 4.

The field is defined by the PN sequence generator polynomial, which is the feedback mask of the LFSR. The field of interest is denoted $GF(2^N)$, where there are N registers in the LFSR and the resultant PN sequence length is $2^N-1$ (the all zero state is excluded from a PN sequence generator). The multiplication gives Z=X·Y, where X, Y, Z are all elements of $GF(2^N)$. The X register is a standard shift register; the Y register is static the Z register is a linear feedback shift register with additional insertion XOR inputs for the output of the X shift register masked by the Y register contents. The result is obtained by initializing the X and Y registers to the factors and the Z register to all zeros, and clocking the circuit N times. The Z register then contains the product. This operation can be accomplished fairly easily in software with bitwise manipulation, or may be implemented in hardware.

The distance of the sequence hop is the slot period, which is the time from the beginning of one slot to the beginning of the next slot. The reason for choosing the beginning of the slot prior to sleep as the hop base rather than a later time just prior to sleep is simply regularity. In practical applications it is possible that the mobile will be required to perform certain other tasks after a slot, and thus the time at which the mobile shuts off may vary. By always using the beginning of the slot as the hop's base, the length of the hop never changes and thus the polynomial needed for the GF multiplication is constant.

Define the following variables: p1 M1=number of "clock cycles" or state transitions equivalent to the sequence hop.

Ts=slot period, in seconds. This is the hop distance in seconds.

Tr=hop resolution, in seconds. If necessary, hops shorter than Ts can be made with this time resolution.

F=the frequency of the PN sequence generator clock, in Hz

Typically, for full slot period hops, M1 can be found as:
M1=Ts*F

Incrementing the insertion sequence generator by one clock cycle is the same as multiplying the state polynomial by x, where the state polynomial is denoted as a function of x. Thus, to get the PN sequence generator state that would have resulted from M1 clocks, multiply the base state polynomial by $x^{M1}$. In $GF(2^N)$, $x^{M1}$ is a polynomial with N coefficients, which can be precalculated and stored as an N bit vector, in a Read Only Memory (ROM) for example.

Under certain conditions a hop that is shorter than a full slot period may be necessary. An example in cellular communications is when the mobile user initiates a call and the unit is in the middle of a very long sleep period. It is desirable that the sleep should terminate immediately such that the call may be placed. In this condition the mobile must compute the next time at which it can fully resume operations, as is determined by the amount of time transpired and the hop resolution Tr described above.

Define the following variables:

K=is the multiple of Tr which determines the length of resultant the shortened hop.

M2=number of state transitions corresponding to hop resolution

M3=number of state transitions corresponding to shortened hop then:

M2=Tr*F

M3=K*M2=K*Tr*F

Again, the generator state after the hop is given by multiplying the prior state by $x^{M3}=(x^{M2})^K$. Recall that $x^M$ for arbitrary M is a polynomial with N coefficients, as defined by Galois Field theory. Each coefficient is a single bit, and thus $x^M$ is simply processed and stored as a N bit vector. While these polynomials can be arduously calculated by the system, it is preferred to store a certain basis set of polynomials and use these to derive any additional polynomials as needed. This can be done by the simple and intuitive GF relationship:

$$x^{a+b}=x^a*x^b$$

where a and b are any arbitrary integers.

Thus, the following are stored:

$H=x^{M1}$; the polynomial used for a regular slot period hop.

$G_n=(x^{M2})^{\wedge}2^n$; series of polynomials for calculating arbitrary hops Note that in a real system there may be more than on possible slot period and thus more than one hop polynomial stored. The array of $G_n$ contains the polynomials that can be easily used to obtain an arbitrary hop distance, as illustrated below.

Define the following:

$S_0$ the value of the base polynomial state of the sequence generator which is used for the hop—this is the value written at the beginning of the first slot or retained in memory for subsequent slots, corresponding to the first generator state of the slot.

$S_1$ the polynomial state of the generator after the hop, which should be the first chip of the next slot. Per FIG. 3 this is loaded as step 2. and begins running at step 3. Note that this is the slot after the slot used to give $S_0$ above.

The calculation of the new generator state for a normal full slot period hop is simply done with GF multiplication, as is shown in FIG. 4:

$$S_1=S_0*H$$

In the event that the mobile must exit sleep early due to a user initiated call or some other event, the mobile must perform all tasks similar to the timeline of FIG. 3, but the polynomials used for the multiplication will be different to reflect the shorter hop. As stated above, the mobile must compute the value K based on the next acceptable start time, which is based on the time transpired, the time of hop base state $S_0$, the hop resolution Tr, and the time required for timing reacquisition and radio settling. In any common system this value will be computed and stored as a binary number. Thus the hop time is K*Tr, where K can be broken down into its individual bits (this example assumes an 8 bit value):

$$K=2^7k_7+2^6k_6+\ldots+2^1k_1+k_0$$

then the PN sequence generator at that desired time using the $G_n$ values stored:

$$S_1 = S_0 \cdot \prod_{n=0\ldots7} (G_n)^{\wedge}k_n$$

This requires a series of polynomial multiplications, each performed as shown in FIG. 4. The example above uses a the 8 bit hop field K, which requires 9 polynomial multiplications. Thus this requires more computation time than the fixed slot period hop, which requires only one multiplication.

E. Further Implementation Details

Figure 5:
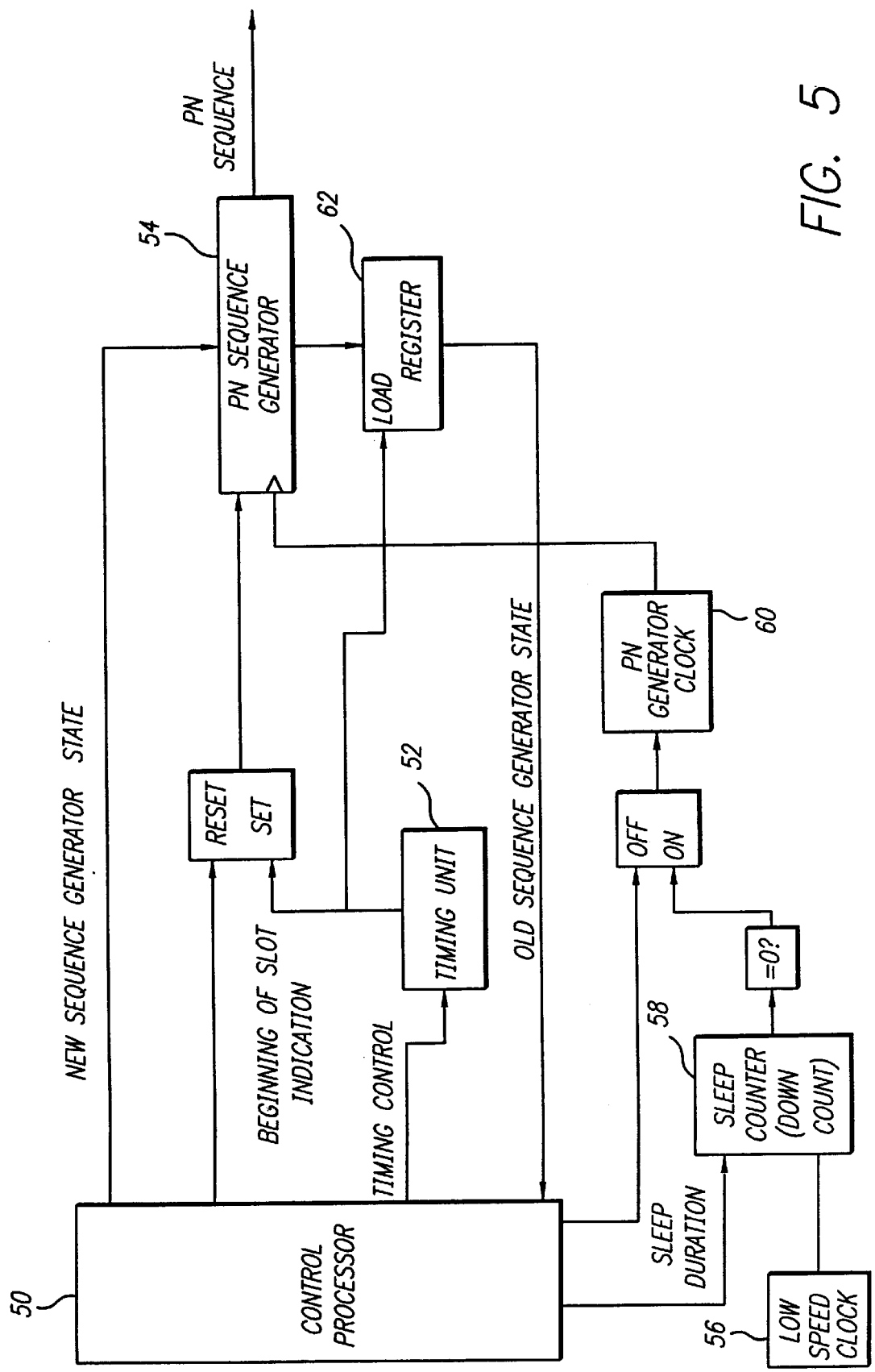
FIG. 5 is a block diagram of a preferred embodiment of the present invention.

A simple block diagram of a preferred embodiment of a PN sequence hopping system according to the present invention is shown in FIG. 5. The present invention uses the state of a PN sequence generator 54 prior to a sleep period to calculate a new state at a desired time after the end of the sleep period. In this way a high speed clock 60 which runs the PN sequence generator 54 can be turned off. A low speed clock 56, typically a 32 kHz oscillator, is maintained and controls a counter 58 to let the system know when to turn back on.

Prior to a first hop, at the beginning of a slot, the PN sequence generator is at a base state which is written to a register 62 and read by a Control Processor (CP) 50 for use in calculating the new state. For all subsequent hops, the base state is equal to the new state calculated in the previous hop, and thus the CP 50 does not need to read the register 62 for subsequent hops. The PN sequence hop computation is performed in the CP 50, which loads the new state into the PN sequence generator 54. The exact time at which the PN sequence generator 54 is restarted (enabled) is controlled by a hardware timing unit 52 which is itself controlled by the CP 50. The PN sequence generator 54 restart time will generally be hardware controlled in this manner because it must be correct to within one generator clock cycle, and a CP 50 cannot generally control hardware parts to this resolution with ease. Similarly, while the PN sequence generation could be done within the CP 50, this is typically not done because of the speed required and the simplicity of the generator circuit. At the start of a slot the PN sequence generator 54 writes its state into the register 62 such that it may be used for the next hop. Note that in steady state this is not necessary, as the value has just been written and is already known. However, this function is needed to give the sequence state necessary for the very first hop performed. When the PN sequence generator 54 is enabled at the start of the slot, the PN sequence is properly aligned and the MS can successfully receive the required slot.

Since the present invention allows the high speed clock 60 to be turned off during sleep mode while the lower speed clock 56 keeps track of the sleep time, there is a power savings obtained by using PN sequence hopping. This is because lower speed clock and counters using this clock will consume less power than a higher speed clock. The present invention is particularly advantageous for long and rapid PN sequences because long sequences are harder to initialize from scratch at some arbitrary timing, and rapid sequences require a faster, higher power clock.

In the context of cellular systems, the present invention can significantly increase the standby time of a cellular phone. This means longer battery life and a longer time between battery recharges by a user. Standby time is a key parameter in evaluating the relative worth of competing cellular phones on the market.

There are numerous ways to subtly change the implementation. At the highest level, different partitioning between CP and hardware is possible. More fundamental possible changes are:

1. GF polynomial multiplication can be done in different ways. For example, while the described embodiment uses a serial GF polynomial multiplier, a parallel multiplier is possible.
2. Rather than using GF polynomial multiplication, it is possible to use matrix multiplication. In this approach rather than raising the single state transition polynomial multiplier x to some power and using the result for polynomial multiplication of the base state polynomial, one can raise the single state transition matrix to some power and use the result for matrix multiplication of the base state vector. This multiplication would be done with mod-2 arithmetic. While this is a possible alternative realization, it involves greater complexity and greater memory utilization.
3. One could change the time from which the base state is used. In a preferred embodiment the base state used in this multiplication is the beginning of the slot prior to the hop. This is arbitrary, and a system polynomial must always be available.
4. There are two complimentary circuits that generate the same PN sequence: the insertion and prime architectures. This embodiment assumed the insertion architecture. A realization could be made with a complimentary prime architecture.

The present invention may be used for resynchronization in any system that may require that the PN sequence bearing signal is not monitored for some time and must subsequently be recovered. As described previously, this may be used for "sleep" modes and introduces power savings. However, this invention may also be applied to non-sleep modes; here the gain is not in power savings but possibly in ease of implementation. If the mobile station stops monitoring the base station transmission for any reason, a timing error will accumulate. Ceasing to monitor transmission may be due to sleep or required measurements of other base stations. A shorter "pilot" PN sequence can be used to recover timing information. If there has been significant timing error accumulation in the mobile then the longer PN sequence must now be readjusted to the correct timing. This can be done by slewing the timing (adjusting it incrementally one step at a time), or possibly by some hopping technique. Arbitrary hops with a resolution of 1 state transition (or generator "clock cycle") can be used to move the generator timing backwards or forwards. This is impractical as the hop would have to include any clock cycles skipped during the hop calculation period itself, a complex interaction between high speed hardware and software. However, a similar procedure to that of FIG. 3 can be used, but where off time is riot sleep time but rather something else like other frequency search time. Again, this does not provide current savings but a possibly easier way to reacquire timing after a period with no time tracking.

Although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiment shown in the drawings and described in detail hereinabove. Therefore, it is intended that all such variations not departing from the spirit of the invention be considered as within the scope thereof as limited solely by the claims appended hereto.

In the following claims, those elements which do not include the words "means for" are intended not to be interpreted under 35 U.S.C. §112 ¶6.

What is claimed is:

1. A method for PN sequence hopping where a PN sequence generator has been disabled for a predetermined time before a future time slot where the PN sequence generator will be enabled, comprising the steps of:

writing a base state into storage for a first hop only;

calculating from the base state a new state advancing a PN sequence to the beginning of the future time slot;

loading the new state into the PN sequence generator; and enabling the PN sequence generator, wherein the base state for subsequent hops is the new state calculated in the previous hop.

2. The method of claim 1, wherein the step of calculating a new state comprises multiplying the base state by a Galois Field polynomial.

3. The method of claim 2, wherein the step of multiplying the base state is performed using a serial Galois Field multiplier.

4. The method of claim 3, wherein the serial Galois Field multiplier is a linear feedback shift register utilizing insertion architecture.

5. The method of claim 2, wherein a first Galois Field polynomial is used to calculate a regular slot period hop, and a set of Galois Field polynomials is used to calculate arbitrary hops.

6. The method of claim 1, wherein a high speed clock is input to the PN sequence generator while the PN sequence generator is enabled, and the high speed clock is turned off while the PN sequence generator is disabled.

7. The method of claim 6, wherein a low speed clock is input to a counter which determines when the PN sequence generator will enabled.

8. A method for PN sequence hopping where a PN sequence generator has been disabled for a predetermined time before a future time slot where the PN sequence generator will be enabled, comprising the steps of:

writing a base state into storage for a first hop only;

calculating from the base state a new state advancing a PN sequence to the beginning of the future time slot by multiplying the base state by a Galois Field polynomial, wherein multiplication is performed using a serial Galois Field multiplier;

loading the new state into the PN sequence generator; and enabling the PN sequence generator, wherein the base state for subsequent hops is the new state calculated in the previous hop.

9. The method of claim 8, wherein the serial Galois Field multiplier utilizes insertion architecture.

10. The method of claim 8, wherein a first Galois Field polynomial is used to calculate a regular slot period hop, and a set of Galois Field polynomials is used to calculate arbitrary hops.

11. The method of claim 8, wherein a high speed clock is input to the PN sequence generator while the PN sequence generator is enabled, and the high speed clock is turned off while the PN sequence generator is disabled.

12. The method of claim 11, wherein a low speed clock is input to a counter which determines when the PN sequence generator will enabled.

13. A PN sequence hopping system, comprising:

a storage device, wherein a base state is written into the storage device for a first hop only;

a PN sequence generator, wherein the PN sequence generator is disabled for a predetermined time before a future time slot where the PN sequence generator will be enabled; and a control processor which calculates from the base state a new state advancing a PN sequence to the beginning of the future time slot, and loads the new state into the PN sequence generator, which is subsequently enabled, wherein the base state for subsequent hops is the new state calculated in the previous hop.

14. The system of claim 13, wherein the control processor calculates the new state by multiplying the base state by a Galois Field polynomial.

15. The system of claim 14, wherein the control processor utilizes serial Galois Field multiplication.

16. The system of claim 15, wherein the serial Galois Field multiplication utilizes insertion architecture.

17. The system of claim 14, wherein a first Galois Field polynomial is used to calculate a regular slot period hop, and a set of Galois Field polynomials is used to calculate arbitrary hops.

18. The system of claim 13, further comprising a hardware timing unit which determines the exact time at which the PN sequence generator will be enabled.

19. The system of claim 13, wherein a high speed clock is input to the PN sequence generator while the PN sequence generator is enabled, and the high speed clock is turned off while the PN sequence generator is disabled.

20. The system of claim 19, further comprising a low speed clock, wherein the low speed clock controls a counter to let the system know when to turn back on after the PN sequence generator has been disabled.

* * * * *